Aug. 25, 1964     J. L. FRENCH     3,145,488

VIBRATING BUCKET

Filed Dec. 26, 1962     2 Sheets-Sheet 1

INVENTOR.
J. L. FRENCH

BY *William A. Murray*

ATTORNEY

Aug. 25, 1964   J. L. FRENCH   3,145,488
VIBRATING BUCKET
Filed Dec. 26, 1962   2 Sheets-Sheet 2
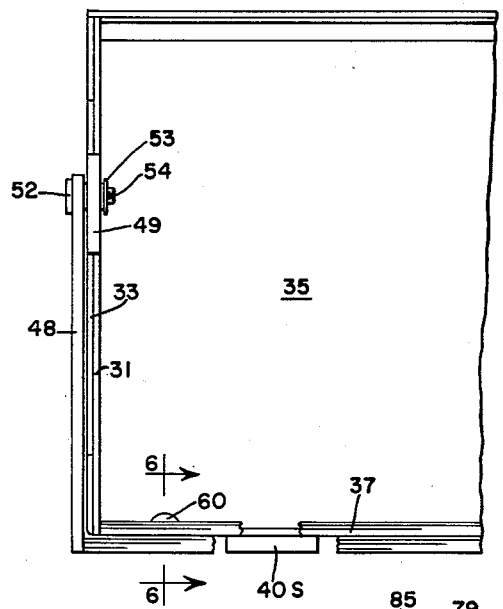
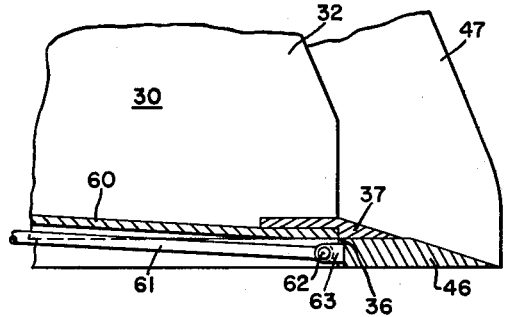
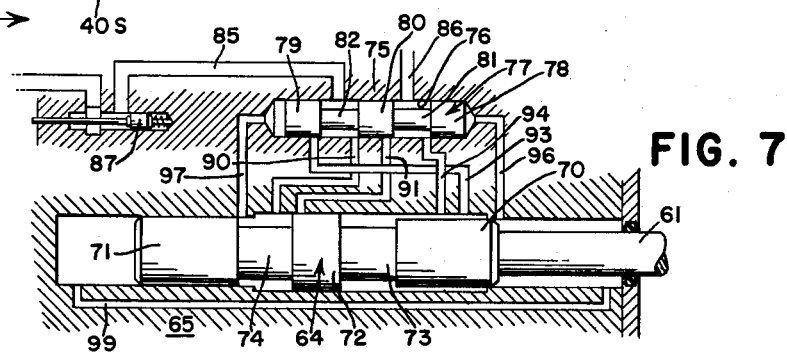
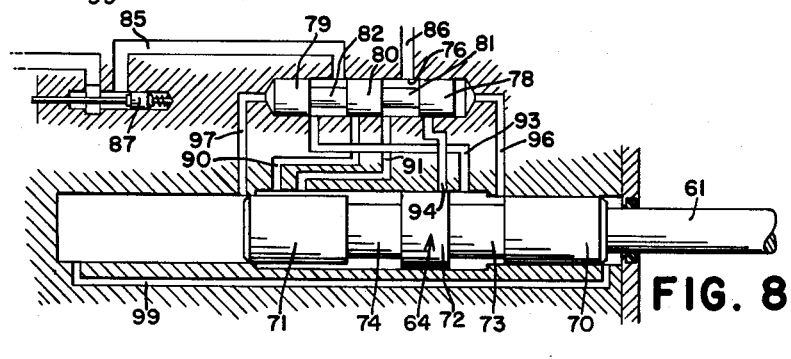
INVENTOR.
J. L. FRENCH
BY William A. Murray
ATTORNEY

United States Patent Office 3,145,488
Patented Aug. 25, 1964

3,145,488
VIBRATING BUCKET
John L. French, Moline, Ill., assignor to Deere & Company, Moline, Ill., a corporation of Delaware
Filed Dec. 26, 1962, Ser. No. 246,883
6 Claims. (Cl. 37—141)

This invention relates to a power loader and more particularly to a vibrating cutting edge on a material carrying bucket for the power loader.

It is the primary object of the present invention to provide a forward vibrating cutting mechanism at the forward end of a material carrying bucket of a new and novel design which may become substantially rigid with the bucket when the vibrating forces are not applied to the cutting edge and consequently will become in effect a rigid part of the bucket.

It is also an object of the invention to provide a new and novel type of hydraulic system effecting the reciprocation of the cutting edge which features a hydraulic cylinder with a ram end connected to the cutting edge. Associated with the hydraulic cylinder and the ram is a valve mechanism which maintains continuous reciprocation of the ram and the connected cutting edge.

Other objects and advantages of the present invention will become apparent to those skilled in the art as the nature of the invention is better understood from the following description and as shown in the accompanying drawings.

FIG. 5 is a front view of one end of the bucket looking into the open portion of the bucket.

FIG. 6 is an enlarged sectional view taken substantially along the line 6—6 of FIG. 5.

FIG. 7 is a schematic view of the valve mechanism utilized in reciprocating the cutting edge on the bucket.

FIG. 8 is a schematic view, similar to FIG. 7, showing the valve mechanism in a different position.

The present invention is described in its relation to a power loader that includes a pair of boom arms and a bucket at their forward ends. It should, however, be recognized that all other types of loaders, such as backhoes, clamshells, and others would operate to advantage with use of the invention.

Figure 1:
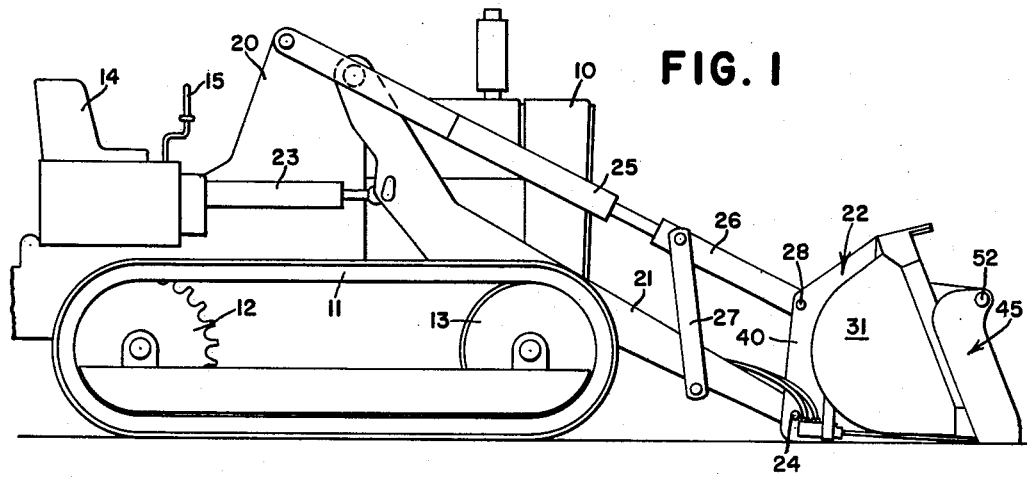
FIG. 1 is a side view of a tractor and loader utilizing the principles of the present invention.
Figure 2:
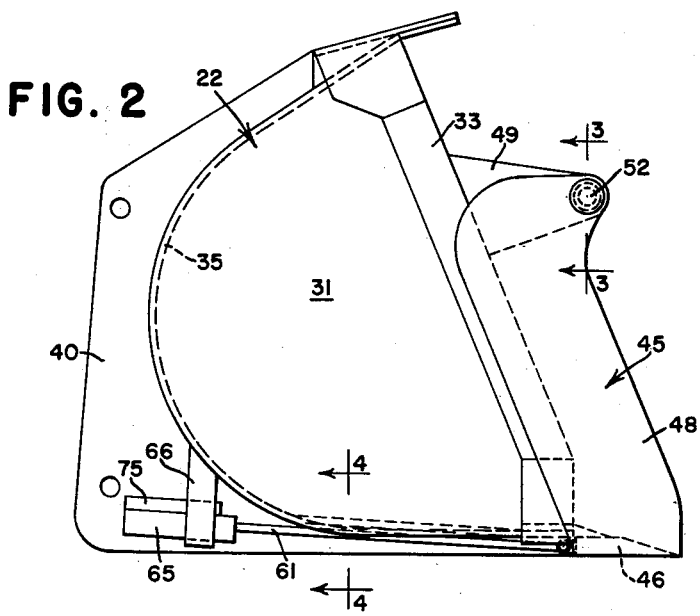
FIG. 2 is an enlarged side view of the bucket on the loader.

Referring now to FIG. 1, there is provided a conventional track-laying type tractor having a main body 10 and supported on opposite sides by tracks, such as at 11, the latter being driven by a driving sprocket 12 and extending over a forwardly positioned guide wheel 13. The body 10 has an operator's station, indicated in its location by the tractor seat 14, having various control levers, such as at 15, to control the tractor and the loader mechanism presently to be described.

The loader is composed of a pair of upright frames 20 on opposite sides of the tractor and supported in the conventional manner on the tractor body 10, and forwardly directed booms 21 with a bucket 22 carried at their forward ends, the booms 21 are raised and lowered by means of hydraulic cylinders 23 and the bucket is tilted about forward pivots 24 on the booms 21 by means of hydraulic cylinders 25, the latter being connected to the main supports 20 and to roll-over type linkages including vertically disposed arms 27 connected to the boom 21 at their lower ends and links 26 connected at 28 to upper portions of the bucket 22 and to the arms 27. As the cylinders 25 extend and retract the entire bucket will pivot about the lower pivots 24 and the linkages 26, 27 will effect a fast roll over relative to the booms 21. It should be recognized that while the present loader has been described relative to the structure shown on the right side of the tractor, similar structure exists on the left side of the tractor and is connected in similar manner to the bucket 22.

The bucket 22 is composed of oppositely disposed upright sides or end plates 30, 31 having arcuate shaped edges including, upper, lower, front and rear edge portions. The front edge portions are reinforced by front edge plates 32, 33. Interconnecting the upper, lower and rear edge portions is a transversely extending U-shaped wall defining the top, back, and bottom or floor of the bucket 22. The wall 35 terminates in a lower forward or front edge 36 extending transversely across the forward end of the bucket. A cutting element 37 extends forwardly of the front edge 36. The wall 35 has rearwardly projecting reinforcing structure 40 that may be welded to the rear and under face of the wall 35. In the latter location the straps 40 are of relatively flat construction and operate not only as reinforcing for the plate 35 but also as skids, such as shown at 40s, on the underside of the bucket, the latter terminating as a lower extension or part of the front edge 36 of the wall 35. The reinforcing ribs 40 are also provided with openings for receiving the pivots 24, 28 that connect the bucket to the boom 21 and link 26 respectively. Again, it should be recognized that there is a pair of reinforcements or straps 40 transversely spaced on the bucket wall 35 so as to receive the pair of booms 21 and the pair of links 26. While not shown, it is clearly evident to those skilled in the art that such would be required and it is conventional in most loaders.

Figure 3:
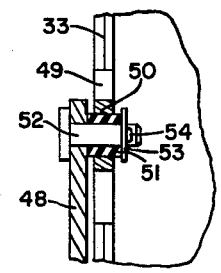
FIG. 3 is an enlarged sectional view taken substantially along the line 3—3 of FIG. 2.
Figure 4:
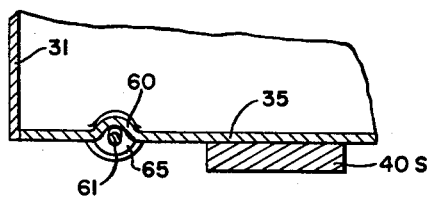
FIG. 4 is a sectional view taken substantially along the line 4—4 of FIG. 2.

A U-shaped cutter 45 is provided adjacent the forward end of the bucket 22. The cutter 45 has a horizontally disposed cutting blade or portion 46 with a rear edge adjacent to the lower portion of the front edge 36. The U-shaped cutter 45 also includes upright sides 47, 48. A pair of brackets, one of which is shown at 49 is rigid with and extends forwardly from the forward edge portion 33 of the bucket side 31. The manner of mounting the cutter blade sides 47, 48 is shown in detail in FIG. 3 relative to the side 48 and in respect to the forwardly projecting bracket 49. The bracket 49 has an opening 50 therein through which is positioned a flexible rubber bushing 51 which in turn receives a transverse pin 52. The pin 52 also extends through the upright side 48 and is held in the side 33 by means of a washer 53 and cotter pin 54. A similar arrangement is provided on the left side of the bucket and consequently the entire cutter 45 may move fore and aft on the axis of the pivot pins, one being shown at 52. In normal disposition, the rear edge of the cutter blade 46 will be in substantial abutting relation to the lower portion of the front edge 36 of the bucket bottom.

The floor 35 of the bucket is provided with suitable fore and aft extending ribs 60 that are arcuate in cross section and generally accommodate fore and aft extending connecting rods 61 disposed under the bucket floor 35 and connected at 62 to rearwardly projecting ears 63 on the rear edge of the blade portion 46. The rods 61 are extensions of pistons 64 positioned in hydraulic cylinders 65. The cylinder 65 is connected to the bucket by suitable brackets 66. The purpose of the piston 64 and its connecting rods 61 is to create a vibrating effect in the cutting edge 46.

Referring now to FIGURES 7 and 8, the piston 64 is composed of enlarged ends 70, 71 and an enlarged central portion 72, the enlarged sections being separated by first and second reduced sections 73, 74.

Associated with the hydraulic cylinder 65 is a valve casing 75 having an elongated bore 76. Contained within the bore 76 is an axially shiftable spool valve 77 having enlarged end sections 78, 79 and an enlarged central section 80, the enlarged sections being separated by reduced sections 81, 82.

A fluid inlet 85 and a fluid outlet 86 open into the valve bore 76. Contained in the fluid inlet 85 is a manually operated valve 87 which may be positioned adjacent the operator's station and will, when opened, operate the entire vibrating structure presently to be described. The outlet 86 opens to a fluid reservoir, not shown.

A first pair of axially offset passages comprising a first fluid inlet passage 90 and a first return passage 91 supplies and returns fluid from the first reduced section 74 of the piston via the valve bore 76. A second pair of fluid passages comprising a second fluid inlet passage 93 and a second fluid discharge passage 94 extends from the valve bore 76 to the second reduced section 73 of the piston 64. All the passages 90, 91, 93, and 94 are axially offset in the valve bore 76 and the cylinder 65 so that the vibrating functions of the piston 64 and its control valve may operate properly. A third pair of fluid passages 96, 97 lead from opposite ends of the casing bore 76 and open into a cylinder adjacent respectively the enlarged ends 70, 71 of the piston. The valve and cylinder mechanism operates in the following manner.

Assuming that the manual valve 87 is open, as is shown in FIGS. 7 and 8, the fluid will pass into the valve bore 76 via the inlet's passage 85. Referring first to FIG. 7, fluid passes through the recessed portion 82 of the valve and into the recessed portion 74 of the piston. Fluid passes from the valve to the piston via the fluid passage 90. The first discharge passage 91 is blocked by the enlarged portion 80 of the valve. At this time the second fluid inlet 93 is blocked by the enlarged portion 79 and the fluid discharge passage 94 is open to the outlet 86. Consequently pressure is built behind the enlarged portion 72 of the piston and the piston will move to the right, as shown in FIG. 7, to a point substantially as shown in FIG. 8 at which time the discharge passage 94 is blocked by the enlarged central section 72 of the piston and fluid is forced into one of the third fluid passages 96. At the opposite end of the cylinder the enlarged portion 71 of the piston no longer blocks the passage 97 and consequently the further shifting of the piston 64 will force the valve to shift to the left thereby opening the second fluid inlet passage 93 so that fluid will pass from the inlet 85 to the recessed section 73 of the piston. At the same time the second fluid discharge outlet 94 is blocked by the valve section 78. At the opposite end of the piston the first fluid discharge 91 is open to the outlet 86 and the first fluid inlet is blocked by the enlarged valve portion 80. Consequently the entire piston will reverse its direction and move to the left to a point substantially shown in FIG. 7, at which time the valve reciprocates and again operates to move the piston to the right. Consequently the valve and piston arrangement operates to automatically reciprocate or vibrate the cutter section 64 whenever the manual valve 87 is retained open. There is also provided in the hydraulic cylinder a bypass passage 99 which opens to opposite ends of the cylinder bore and prevents a fluid build up in advance of the piston, the fluid, either gaseous or liquid, being moved to the opposite end of the cylinder as the piston moves toward one end.

In operation the cutter 45 will reciprocate fore and aft from a position in which a rear edge of the cutter blade 46 has its rearwardmost position substantially abutting the forward end of the bucket to a position spacedly forward of that edge. Upon the valve 87 being closed, there will be sufficient linkage in the valve and piston mechanisms to permit the blade portion 46 to abut the edge 36. The purpose of so positioning the cutter will permit the cutter blade 46 to have a solid support when it is desired not to use the vibrating mechanism. This becomes important since in most instances there is tremendous pressure placed on the forward cutting edge upon the loader bucket being driven into material to be loaded in the bucket. To provide a solid rear support on the rear edge of the blade section 46 therefore retains the strength of the bucket as support thereof. This prevents the entire load, when the vibrating mechanism is not in force, from being applied on the connecting rods 61.

While only one form of the invention has been shown, it should be recognized that other forms and variations will occur to those skilled in the art. Therefore, it is the purpose in illustrating the invention in the present concise and detailed manner to completely present the principles of the invention, and it is not intended to limit or narrow the invention beyond the broad concepts set forth in the appended claims.

What is claimed is:

1. In a power loader having a loader bucket composed of opposed upright transversely spaced sides with front edge portions and lower edge portions respectively and a floor having a front edge and extending between the lower edge portions of the sides and defining therewith a bucket section of U-shaped cross section, the improvement comprising: a U-shaped cutter having a horizontal cutting portion adjacent to and continuing forwardly of the front edge of the floor and a pair of upright sides lying adjacent the front edge portions of the sides; means pivotally mounting the cutter sides to the front edge portions of the bucket sides whereby said cutter may move fore and aft; an hydraulic cylinder supported on the bucket and having a ram extending toward the cutter; valve means associated with the cylinder effecting continuous and uninterrupted reciprocation of the ram; means connecting the ram to the cutter whereby the horizontal cutting portion will vibrate between a closely proximate abutting position relative the front edge of the bucket and a position spaced forwardly of the front edge.

2. In a power loader having a loader bucket composed of opposed upright transversely spaced sides with front edge portions and lower edge portions respectively and a floor having a front edge and extending between the lower edge portions of the sides and defining therewith a bucket section of U-shaped cross section, the improvement comprising: a U-shaped cutter having a horizontal cutting portion adjacent to and continuing forwardly of the front edge of the floor and a pair of upright sides lying adjacent the front edge portions of the sides; means pivotally mounting the cutter sides to the front edge portions of the bucket sides whereby said cutter may move fore and aft; an hydraulic motor supported on the bucket and operatively connected with the cutter; valve means associated with the motor effecting continuous and uninterrupted fore-and-aft vibration of the cutter whereby the horizontal cutting portion will vibrate between a closely proximate abutting position relative the front edge of the bucket and a position spaced forwardly of the front edge.

3. In a power loader having a loader bucket composed of opposed upright transversely spaced upright sides and a floor having a front edge and defining with the sides a bucket section of U-shaped cross section, the improvement comprising: a cutter having a horizontal cutting portion abutting against and continuing forwardly of the front edge of the floor and a pair of upright sides lying adjacent the bucket sides; means mounting the cutter sides to the bucket sides whereby said cutter may move fore and aft; an hydraulic motor supported on the bucket and operatively connected with the cutter; valve means associated with the motor effecting continuous and uninterrupted fore-and-aft vibration of the cutter whereby the horizontal cutting portion will vibrate between its abutting position relative the front edge of the bucket and a position spaced forwardly of the front edge.

4. In a power loader having a loader bucket composed of opposed upright transversely spaced upright sides and a floor having a front edge and defining with the sides a bucket section of U-shaped cross section, the improvement comprising: a cutter having a horizontal cutting portion abutting against and continuing forwardly of the front edge of the floor and a pair of upright sides lying adjacent the bucket sides; means mounting the cutter sides to the bucket sides whereby said cutter may move fore and aft; vibrating mechanism supported on the bucket and operatively connected with the cutter whereby the horizontal cutting portion will vibrate between its abutting position relative the front edge of the bucket and a position spaced forwardly of the front edge.

5. In a power loader having a loader bucket composed of opposed upright transversely spaced upright sides and a floor having a front edge and defining with the sides a bucket section of U-shaped cross section, the improvement comprising: a cutter having a horizontal cutting portion abutting against and continuing forwardly of the front edge of the floor and a pair of upright sides lying adjacent the bucket sides; means mounting the cutter sides to the bucket sides whereby said cutter may move fore and aft, the means including a pair of transversely alined pivot pins and a pair of journal means for the pivot pins composed at least partially of flexible material so that the pivot pins may yield relative to the cutter sides; vibrating mechanism supported on the bucket and operatively connected with the cutter whereby the horizontal cutting portion will vibrate between its abutting position relative the front edge of the bucket and a position spaced forwardly of the front edge.

6. In a power loader having a loader bucket composed of opposed upright transversely spaced upright sides and a floor having a front edge and defining with the sides a bucket section of U-shaped cross section, the improvement comprising: a cutter having a horizontal cutting portion abutting against and continuing forwardly of the front edge of the floor and a pair of upright sides lying adjacent the bucket sides; means mounting the cutter sides to the bucket sides whereby said cutter may move fore and aft, the means including a pair of transverse pivoted connections with means therein yieldable to permit a limited movement of the axes of said connections; vibrating mechanism supported on the bucket and operatively connected with the cutter whereby the horizontal cutting portion will vibrate between its abutting position relative the front edge of the bucket and a position spaced forwardly of the front edge.

References Cited in the file of this patent

UNITED STATES PATENTS

| | | |
|---|---|---|
| 1,840,002 | Wallis | Jan. 5, 1932 |
| 1,984,324 | Stires | Dec. 11, 1934 |
| 2,228,445 | De Velbiss | June 14, 1941 |
| 2,850,815 | Edwards | Sept. 9, 1958 |
| 3,004,523 | Christensen | Oct. 17, 1961 |
| 3,065,557 | Pewthers | Nov. 27, 1962 |